United States Patent [19]

Savage, Jr.

[11] 4,249,697
[45] Feb. 10, 1981

[54] STEAM TRAP MONITOR

[76] Inventor: Harlow D. Savage, Jr., 1224 Farmington Ave., West Hartford, Conn. 06107

[21] Appl. No.: 51,734

[22] Filed: Jun. 25, 1979

[51] Int. Cl.³ .............................................. G05D 23/00
[52] U.S. Cl. .................... 236/94; 73/17 A; 137/551
[58] Field of Search ........................ 236/94, 55-60; 73/340, 17 A; 165/11; 137/551

[56] References Cited

U.S. PATENT DOCUMENTS

| | | | |
|---|---|---|---|
| 1,772,279 | 8/1930 | Fonseca | 236/94 X |
| 3,718,924 | 2/1973 | Trubert et al. | 236/94 |
| 3,926,368 | 12/1975 | Geen | 236/94 X |

Primary Examiner—William E. Tapolcai, Jr.
Attorney, Agent, or Firm—McCormick, Paulding & Huber

[57] ABSTRACT

A temperature differential monitoring device on a steam trap receives signals from a battery powered pulse generator and includes first and second thermistors disposed, respectively, in heat transfer relation with the steam trap and with a condensate conduit connected to the trap. A differential comparator circuit responsive to the outputs of the thermistors activates a first light emitting diode when the temperature differential between the trap and the conduit equals and exceeds a predetermined value and deactivates the first light emitting diode and activates a second light emitting diode when the temperature differential is less than the predetermined value.

13 Claims, 3 Drawing Figures

STEAM TRAP MONITOR

BACKGROUND OF THE INVENTION

This invention relates in general to temperature monitoring devices and deals more particularly with an improved device for monitoring operation of a steam trap. In a steam generating system it is usual to provide a steam trap which removes condensate from the system without appreciable loss of steam. Steam traps conventionally employ a float or other element responsive to the accumulation of liquid condensate for periodically opening a condensate outlet valve to discharge liquid condensate. Condensate is normally removed from the trap through a condensate line connected to the trap and may be returned to the steam generator through return lines for regeneration. When the steam trap malfunctions, steam escapes with condensate through the condensate line which results in heat loss and reduction in the efficiency of the system. Such malfunction is difficult to detect, particularly in a closed system such as aforedescribed where steam leaks through the trap and into the condensate return lines. Heretofore, various means have been provided for detecting when a steam trap is malfunctioning or "leaking through." Such devices have included transparent piping at the steam trap outlet to facilitate visual inspection. However, such clear piping usually becomes coated with rust or other residue from the system within a relatively short time and is wholly ineffective as a leak detector unless cleaned frequently. Bleed valves have also been provided on the condensate lines in such systems. However, such valves must be manually opened and inspected for escaping steam. Unless such inspections are frequent, trap malfunction may go undetected for a long period. Another system, illustrated and described in U.S. Pat. No. 3,926,368, utilizes a thermosensitive indicator strip which is taped or otherwise secured to the condensate line on a trap and which changes color to provide indication of steam within the condensate line. Trap malfunction results in the destruction of the indicator strip which must be replaced if its monitoring function is to be maintained. Such an indicator strip provides an inactive or passive indication of malfunction. A malfunction may go undetected unless the strip is closely scrutinized. Further, where such a steam trap monitoring device is used, it must be assumed that in the absence of indication of malfunction the steam trap and the related portions of the system are functioning properly, because the device does not provide positive indication of proper operation.

It is the general aim of the present invention to provide an improved steam trap monitor which operates substantially continuously to indicate either proper function or malfunction. It is the further aim of the invention to provide an improved substantially self-contained unit which will operate for a long period without maintenance and which may be manufactured at low cost and installed by a person of ordinary skill.

SUMMARY OF THE INVENTION

In accordance with the present invention, a steam generating system which has a steam trap and a condensate conduit connected in fluid transfer relation to the trap includes an improved monitoring device which has first thermally responsive means disposed in heat transfer relation to the trap for generating a first output indicative of trap temperature and second thermally responsive means disposed in heat transfer relation to the condensate conduit for generating a second output indicative of conduit temperature. The device further includes first and second signal means and means responsive to the first and second outputs for activating the first signal means which the temperature differential between the trap and the condensate conduit equals or exceeds a predetermined value and for deactivating the first signal means and activating the second signal means when the temperature differential is less than the predetermined value.

DETAILED DESCRIPTION OF PREFERRED EMBODIMENT

Figure 1:
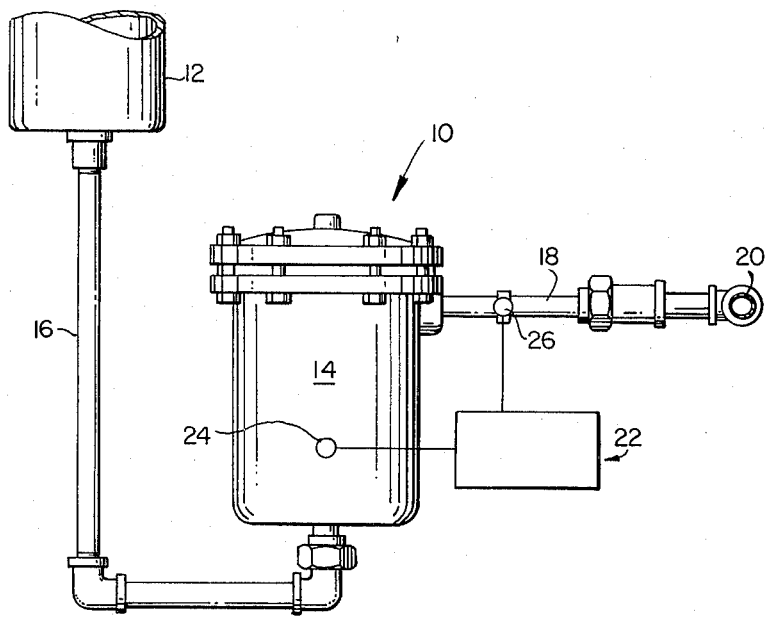
FIG. 1 is a fragmentary side elevational view of a portion of a steam generating system embodying the invention and which includes a steam trap and a steam trap monitoring device attached to the trap.

Turning now to the drawing, a portion of a typical steam generating system embodying the present invention is indicated generally by the reference numeral 10. The system 10 includes a heater 12 and a steam trap of a conventional type designated generally by the numeral 14. The inlet end of the steam trap 14 is connected to the outlet end of the heater 12 by a conduit 16. A condensate conduit indicated at 18 is connected to the steam trap 14 and to a condensate return line designated by the numeral 20. In accordance with the invention a steam trap monitoring device, illustrated somewhat schematically and indicated generally by the reference numeral 22, is shown connected in monitoring relation with the steam trap 14. The illustrated monitoring device 22 may be characterized as a temperature differential monitor and is a substantially self-contained unit which has its own power source, as will be hereinafter further discussed.

The monitoring device 22 generally comprises a first thermally responsive element 24 disposed generally adjacent the outer surface of the trap 14 in heat transfer relation to the trap. The element 24 may, for example, be adhesively secured to the trap or be attached thereto by a suitable fastener or band (not shown). A second thermally responsive element which may be similar to the element 24, is indicated by the numeral 26 and disposed adjacent the outer surface of the conduit or pipe 18 in heat transfer relation therewith. The second element may also be adhered to the pipe or otherwise secured thereto by a suitable band or fastener (not shown). The element 24 provides an output indicative of the temperature of the trap 14 whereas the element 26 has an output indicative of the temperature of the condensate conduit 18. A comparator indicated generally at 28 and responsive to the outputs of the elements 24 and 26 is provided for activating a first signaling device 30 when the temperature differential between the trap and the condensate conduit, as indicated by the elements 24 and 26, equals a predetermined value and when the temperature differential between the trap and the condensate exceeds the predetermined value. The resulting signal indicates that the steam trap and related portions of the system 10 are properly functioning. The comparator means 28 is also responsive to the outputs of the elements 24 and 26 for deactivating the first signaling device 30 and activating a second signaling device 32 when the temperature differential between the trap and the condensate conduit is less than the predetermined value, the latter signal being indicative of steam trap malfunction.

Figure 2:
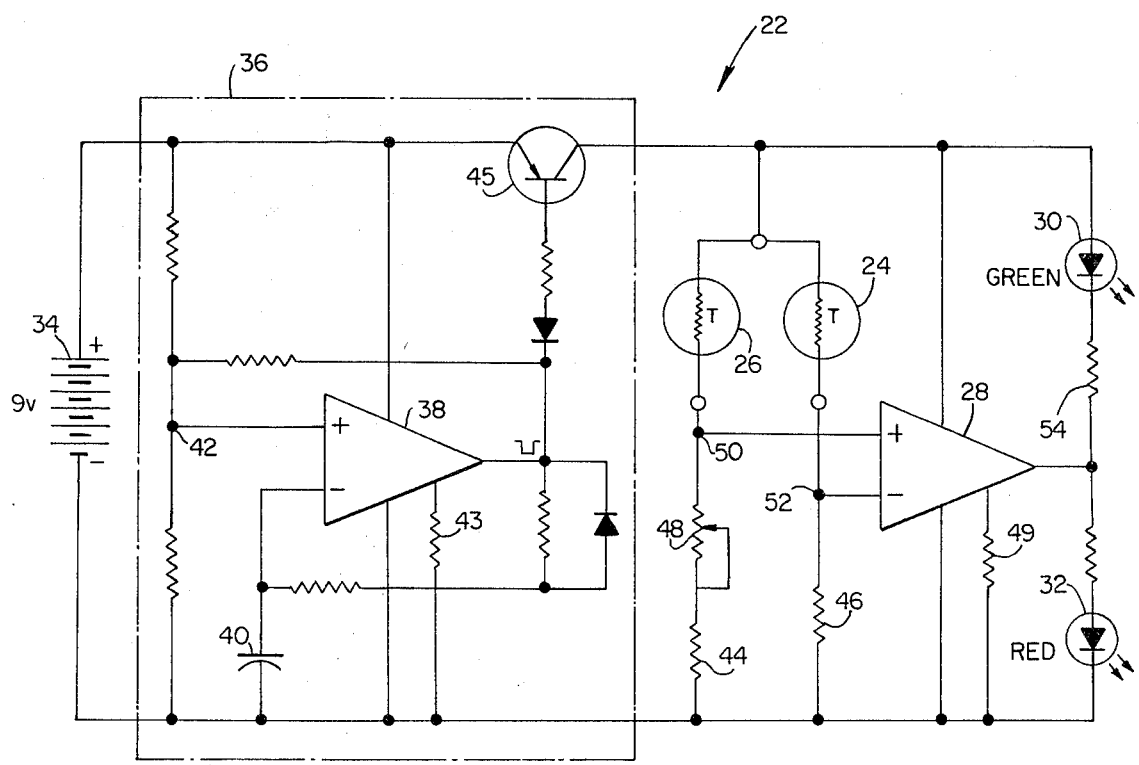
FIG. 2 is a circuit diagram further illustrating the steam trap monitoring device of FIG. 1.

Considering now the monitoring device 22 in further detail and referring more particularly to FIG. 2, the power supply, as illustrated, comprises a nine volt (9 v.) battery 34 which may, for example, be a MALLORY battery type 1604 or its equivalent. The illustrated device further includes a pulse generator connected to the battery and indicated generally by the numeral 36. The basic component of the pulse generator 36 comprises a programmable operational amplifier 38 which acts as a comparator for the voltages found at the upper plate of capacitor 40 and a reference point designated 42 and which is programmed by a single external programming resistor 43. An operational amplifier of a type such as TITL 066; National LM4250 or National LH24250-Dual Unit, for example, is suitable for use in the pulse generator. In accordance with presently preferred construction, the circuit components which comprise the pulse generator 36 are selected to provide a six millisecond pulse output every two seconds. The pulse output is coupled to the base of a transistor 45 which is periodically rendered conductive and applies battery voltage to the sensing and signaling portions of the circuit.

The illustrated thermally responsive elements 24 and 26 comprise thermistors or variable resistors having electrical resistances which vary inversely with temperature. The thermistors 24 and 26 are connected in parallel relation across the pulse generator 36 and in series with voltage dividing resistors 44 and 46 and a potentiometer 48, as shown. The comparator 28 comprises another programmable operational amplifier, which is or may be identical to the amplifier 38. The operational amplifier 28 is programmed by a single resistor 49 and functions as a comparator for voltages at reference points 50 and 52. The signaling devices 30 and 32 each comprise a lamp or light emitting diode (LED). Preferably, and as shown, one LED is green for indicating that the steam trap 14 is properly functioning whereas the other LED is red for indicating malfunction of the trap.

The monitor trip point which corresponds to a predetermined temperature differential at which operational amplifier 28 switches may be varied by adjusting the potentiometer 48. More specifically, the potentiometer 48 may be regulated to vary the temperature differential between the trap 14 and the condensate conduit 18, which produces a voltage differential between the reference points 50 and 52 and a change in state of the output of the amplifier at a point 54.

In the presently preferred embodiment of the invention, the green LED 30 blinks every two seconds when the temperature differential, as indicated by the voltage differential at the reference points 50 and 52, equals a preset value (preferably about 5 degrees) and when the temperature differential exceeds the preset value, thereby indicating normal steam trap operation. However, if the temperature differential falls below the preset value, as may occur when steam escapes from the trap into the condensate line 18, the comparator circuit, which comprises the programmable amplifier 28, turns off the green LED 30 and turns on the red LED 32. The red LED then continues to blink every two seconds indicating malfunction of the steam trap.

The device 10 is self-monitoring, since one or the other of the two LEDs will blink every two seconds thereby indicating that the monitoring device is in proper operating condition. Battery life of the illustrated device is estimated to be about one year. The battery should, of course, be replaced if the LEDs cease to blink. The light emitting diodes are selected for both cost and efficiency. Resistences in the diode circuits may be reduced to provide higher LED brightness at the expense of battery life or may be increased for longer battery life if lower brightness is sufficient for the particular application desired.

Figure 3:
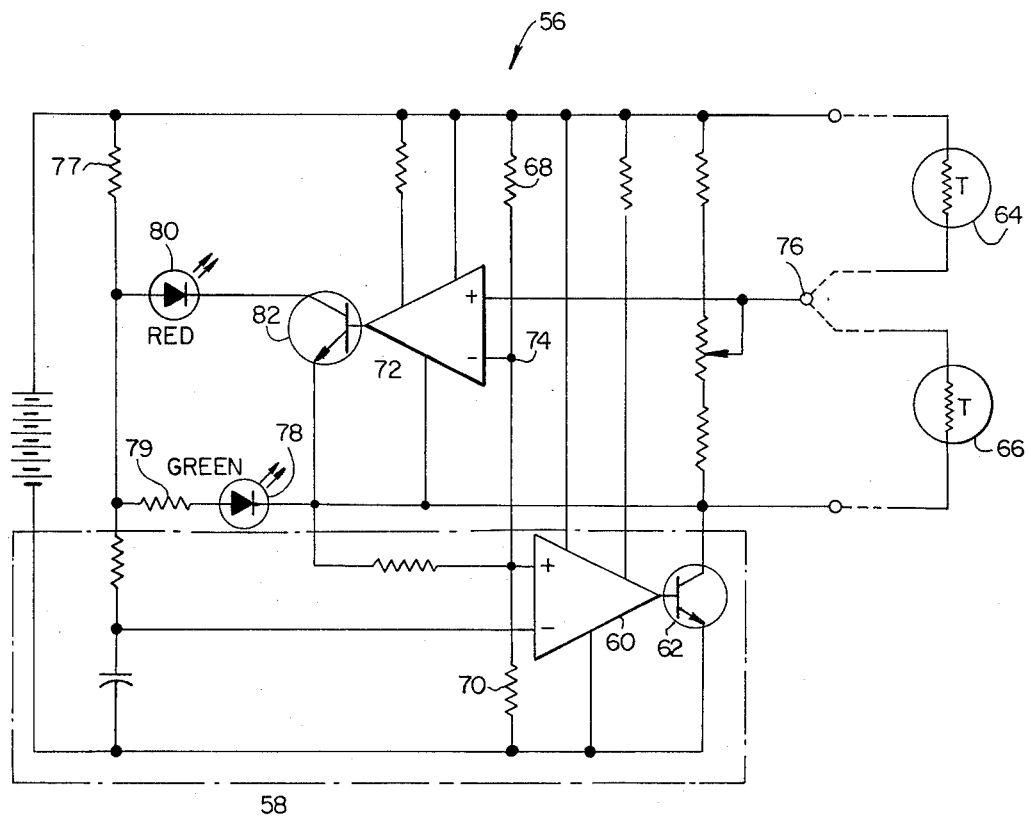
FIG. 3 is another circuit diagram and illustrated another embodiment of the invention.

Referring now to FIG. 3 another steam trap monitoring device embodying the present invention is indicated generally by the reference numeral 56. The illustrated device 56 has fewer components than the monitoring device 22, previously described, and is somewhat more energy efficient. It includes a pulse generator 58, which has as its principal components a programmable operational amplifier 60 and a transistor 62. The monitoring device 56 further includes thermally responsive elements or thermistors 64 and 66, a programmable operational amplifier 72, a transistor 82, and a pair of light emitting diodes which include a green LED 78 and a red LED 80. The thermistors 64 and 66 are connected to a steam trap such as the steam trap 10, shown in FIG. 1, in heat transfer relation with the trap and a condensate return line connected to the trap, as previously described.

When the transistor 82 is turned off the green LED blinks at predetermined intervals in response to pulse output from the pulse generator 58 to indicate that the steam trap 14 is properly functioning. The programmable amplifier 72 compares a predetermined voltage at the reference point 74 with a voltage at the reference point 76, the latter voltage being determined by the temperatures sensed by the thermistors 64 and 66. The trip point of the monitoring device 56, which corresponds to the predetermined temperature differential at which the operational amplifier 72 switches may be varied by adjusting the potentiometer indicated at 84. The transistor 82 which is rendered conductive by output from the amplifier 72 turns on the red LED 80 and shorts out the green LED 78 during each pulse output from the pulse generator 58 to indicate malfunction of the steam trap 14 when the temperature differential between the trap and the condensate conduit 18 is less than a predetermined value.

I claim:

1. In a steam generating system having a steam trap, a condensate conduit connected in fluid transfer relation to said trap, and a device for monitoring operation of said trap, the improvement comprising said monitoring device having first thermally responsive means disposed in heat transfer relation to said trap for generating a first output indicative of the temperature of said trap, second thermally responsive means disposed in heat transfer relation to said condensate conduit for generating a second output indicative of the temperature of said condensate conduit, signal means, and means responsive to said first and second outputs for activating said signal means when the temperature differential between said trap and said condensate conduit is less than a predetermined value.

2. In a steam generating system as set forth in claim 1 the further improvement wherein said signal means comprises first and second signaling devices and said means responsive to said first and second outputs activates said first signaling device when said temperature differential between said trap and said condensate conduit equals and exceeds said predetermined value and deactivates said first signaling device and activates said second signaling device when said temperature differential is less than said predetermined value.

3. In a steam generating system as set forth in either claim 1 or claim 2 the further improvement wherein said monitoring device includes means for varying said predetermined value.

4. In a steam generating system as set forth in either claim 1 or claim 2 the further improvement wherein said monitoring device includes a pulse generator and said outputs comprise electrical pulses.

5. In a steam generating system as set forth in claim 4 the further improvement wherein said monitoring device includes a battery and said pulse generator is electrically connected to said battery.

6. In a steam generating system as set forth in either claim 1 or claim 2 the further improvement wherein said first and second thermally responsive means comprises resistors having electrical resistances which vary with temperature.

7. In a steam generating system as set forth in claim 6 the further improvement wherein said resistors comprise thermistors.

8. In a steam generating system as set forth in claim 2 the further improvement wherein said first and second signal means comprise lamps.

9. In a steam generating system as set forth in claim 8 the further improvement wherein said lamps comprise light emitting diodes.

10. In a steam generating system as set forth in claim 4 the further improvement wherein said means responsive to said first and second outputs comprises a differential comparator circuit.

11. In a steam generating system as set forth in claim 10 the further improvement wherein said comparator circuit comprises an operational amplifier.

12. In a steam generating system as set forth in claim 11 the further improvement wherein said differential comparator circuit includes a transistor rendered conductive by said operational amplifier.

13. In a steam generating system as set forth in either claim 1 or claim 2 wherein said means responsive to said first and second outputs comprises a differential comparator.

* * * * *